United States Patent [19]

Gautier et al.

[11] Patent Number: 5,782,159
[45] Date of Patent: Jul. 21, 1998

[54] PNEUMATIC BOOSTER WITH INERTIAL VALVE

[75] Inventors: Jean Pierre Gautier; Ulysse Verbo, both of Aulnay-Sous-Bois, France

[73] Assignee: Bosch Systems De Freinage, Drancy, France

[21] Appl. No.: 624,568

[22] PCT Filed: Mar. 12, 1996

[86] PCT No.: PCT/FR96/00377

§ 371 Date: Apr. 10, 1996

§ 102(e) Date: Apr. 10, 1996

[87] PCT Pub. No.: WO96/33895

PCT Pub. Date: Oct. 31, 1996

[30] Foreign Application Priority Data

Apr. 25, 1995 [FR] France .................. 95 04904

[51] Int. Cl.[6] ............................................. F15B 9/10
[52] U.S. Cl. ................................. 91/369.1; 91/376 R
[58] Field of Search ........................... 91/369.1, 369.2, 91/376 R

[56] References Cited

U.S. PATENT DOCUMENTS

| | | | |
|---|---|---|---|
| 4,885,979 | 12/1989 | Macht et al. | 91/369.1 |
| 5,176,063 | 1/1993 | Levrai et al. | 91/369.2 |
| 5,214,995 | 6/1993 | Gautier | 91/369.1 X |
| 5,493,948 | 2/1996 | Gautier et al. | 91/369.2 |
| 5,601,008 | 2/1997 | Miwa et al. | 91/376 R |

FOREIGN PATENT DOCUMENTS 0509866  10/1992  European Pat. Off. .

*Primary Examiner*—Hoang Nguyen
*Attorney, Agent, or Firm*—Leo H. McCormick, Jr.; Warren Comstock

[57] ABSTRACT

A pneumatic booster (1) having casing (3) divided by a movable partition (3) into first (3a) and a second (3b) working chambers. The movable partition (4) being urged by a pressure differential derived from a first fluid pressure in the first working chamber (3a) and a second fluid pressure in the second working chamber (3b). The second fluid pressure is communicated to the second working chamber (3b) through the actuation of a shutter (70) by means of a plunger (8). The shutter (70) has freedom of movement with respect to the plunger (8) while being elastically urges against the plunger (8). The shutter (70) is connected to a mass (15) which is set in motion by a movement of the plunger (8). The mass (15) thereafter acts on and moves the shutter (70) away from the plunger (8) to increase the flow of the second fluid pressure to the second chamber (3b).

1 Claim, 3 Drawing Sheets

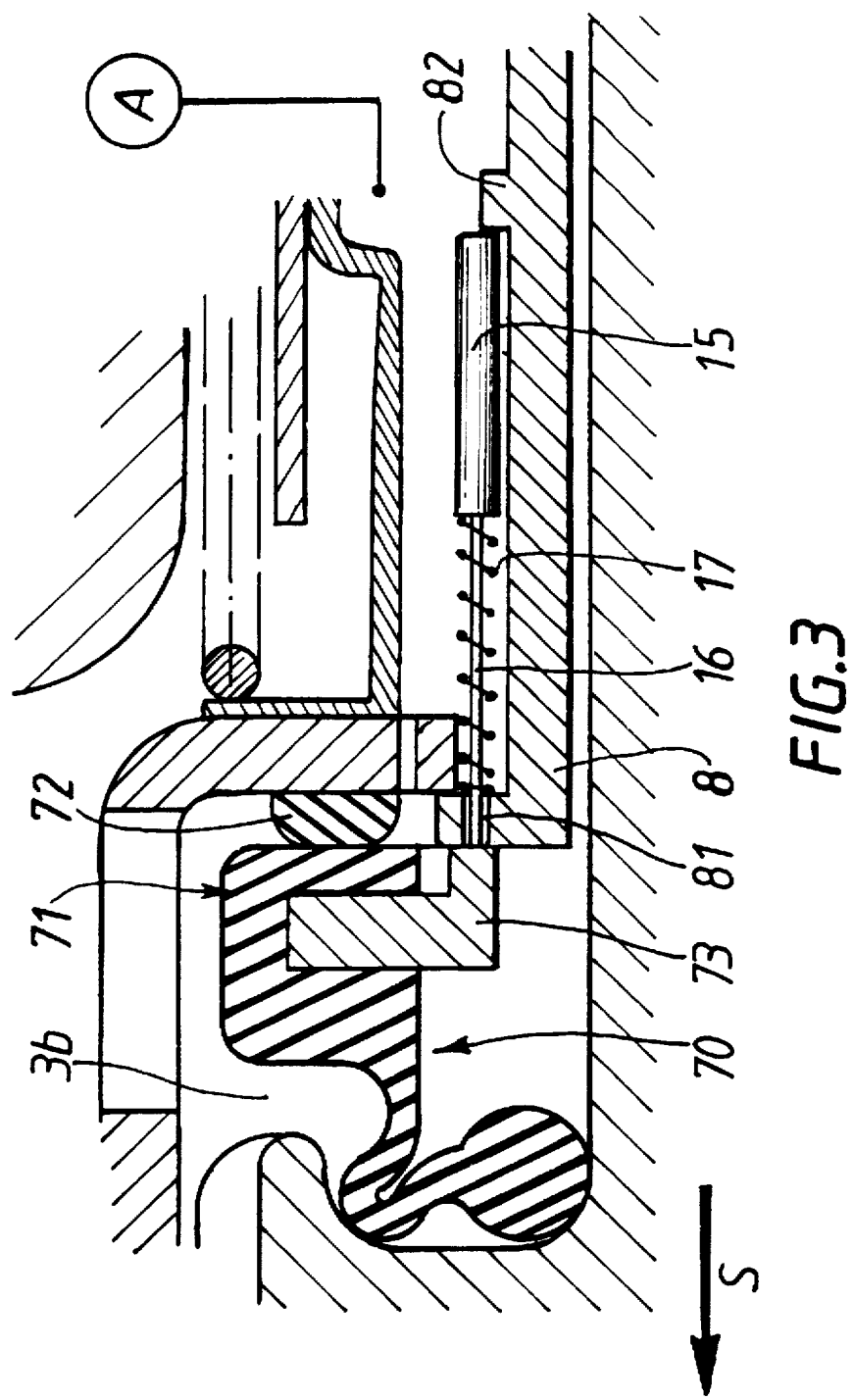

5,782,159

1

PNEUMATIC BOOSTER WITH INERTIAL VALVE

The present invention relates to a pneumatic booster, especially one that can be used for boosting braking in motor vehicles, comprising: a rigid casing divided in leaktight fashion into at least two variable-volume working chambers, the first of which is connected to a first pressure source delivering a first pressure, and the second of which can be connected selectively, by means of a three-way valve, to the first source or to a second pressure source delivering a pressure different from the first; a moving partition separating the two working chambers inside the casing and capable of being urged by a pressure difference established selectively between the two working chambers through the actuation of the three-way valve; a pneumatic piston which can move with the moving partition and which contains the three-way valve, this valve comprising a tubular shutter, a first end of which is selectively applied to a first seat in order selectively to prevent and to allow a flow of air between the second pressure source and the second chamber; an operating rod also housed in the piston, able to move in a first axial direction and controlling the actuation of the three-way valve by means of a plunger capable of moving the first end of the tubular shutter away from the first seat; a push rod which can move in the first axial direction and can receive, in order to transmit it on, an output force oriented in this first axial direction; and reaction means interposed between the operating rod and push rod in order to apply to the operating rod a reaction which increases with the output force.

BACKGROUND OF THE INVENTION

Devices of this type which are well known in the prior art are applied to very many motor vehicles these days to boost braking.

Despite their traditional nature, these devices continue to be the subject of substantial research aimed at optimizing their operating characteristics and especially at reducing their response time without major impact on their cost.

SUMMARY OF THE INVENTION

The specific object of the present invention is to provide a booster which meets these requirements.

To this end, the booster of the invention is essentially characterized in that the shutter has a freedom of movement with respect to the plunger in the first axial direction and is urged elastically against the plunger in a direction which is the opposite of the first axial direction, and in that the first end of the shutter is connected to a mass which can be set in motion by a movement of the plunger in the first axial direction in order to push the first end of the tubular shutter back away from the plunger and thus increase the flow of air between the second pressure source and the second chamber.

Further features and advantages of the invention will emerge clearly from the description thereof given hereafter by way of non-limiting indication with reference to the appended drawings, in which

2

Figure 1:
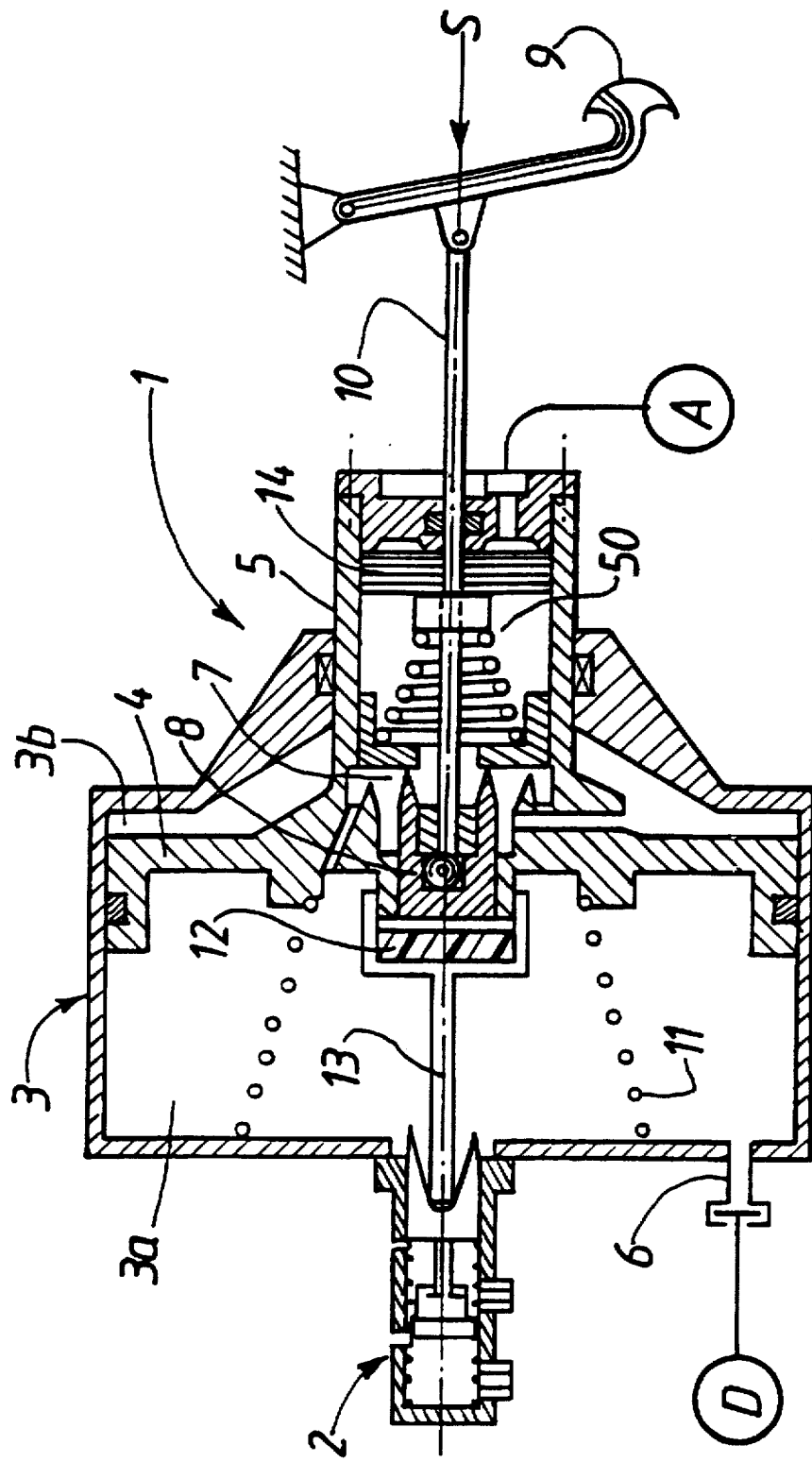
FIG. 1 is a diagrammatic sectional view of a pneumatically boosted braking system using a conventional booster.
Figure 2:
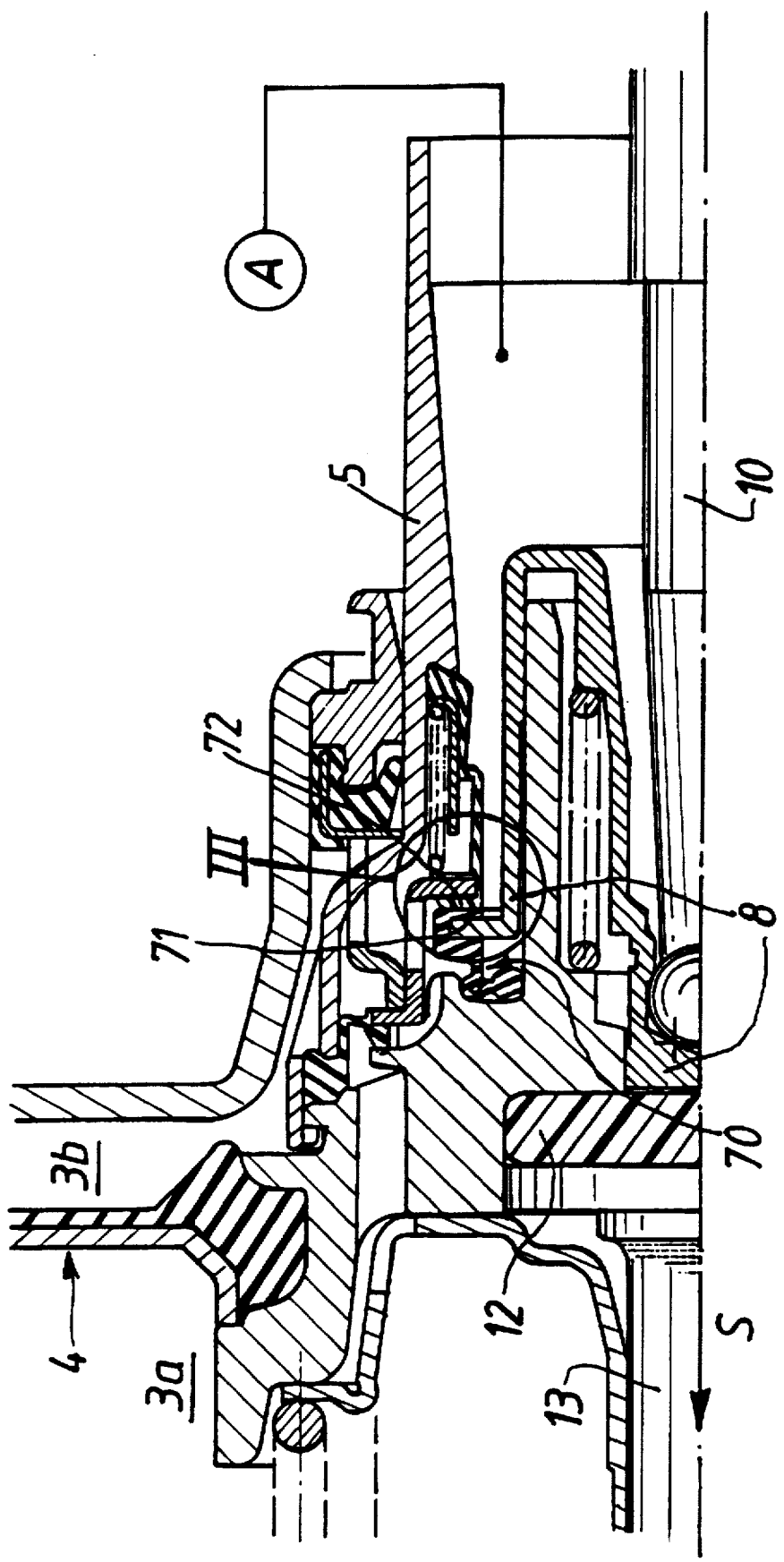
FIG. 2 is a sectional part view of a booster known from the patent U.S. Pat. No. 5,233,907, liable to benefit from the characteristics of the invention and given by way of example.

FIG. 3 is a sectional part view of a detail of the booster of FIG. 2, identified by the reference III of this figure, and modified to incorporate the characteristics of the invention.

DETAILED DESCRIPTION OF THE DRAWINGS

In the traditional fashion, a pneumatically boosted braking system comprises a pneumatic booster 1 and a master cylinder 2.

The booster comprises a rigid casing 3, a moving partition 4, a pneumatic piston 5, a three-way valve 7, an operating rod 10, a push rod 13, and reaction means interposed between the operating rod 10 and push rod 13, for example a reaction disk 12.

The moving partition 4 divides the internal volume of the rigid casing 3 in leaktight fashion into two working chambers 3a and 3b of complementary and variable volume.

The first working chamber 3a is connected to a low-pressure source D via a non-return valve 6, and the second working chamber 3b is capable of being connected selectively, by means of the three-way valve 7, either to the low-pressure source D, or to a source of relatively high pressure A, for example the atmosphere.

By virtue of this layout which is known per se, actuation of the three-way valve 7 which connects the second working chamber 3b to the second source A brings about a difference in pressure between the two working chambers 3a and 3b, the moving partition 4 thus becoming urged by a force which represents the boost force of the booster, and moving inside the casing 3 against the force exerted by a spring 11, driving along with it the pneumatic piston 5 which is secured to the moving partition 4.

In practice, the three-way valve 7 is borne by the piston 5 and operated by actuation of a pedal 9 capable of transmitting to the operating rod 10 an input force exerted in the axial direction S, this operating rod itself being borne by the piston 5 and ending in a plunger 8.

The push rod 13 is mounted so that it can receive, from the reaction disk 12, a thrust which corresponds to the sum of the input and boost forces, and so that it can transmit this thrust on to the master cylinder 2.

The invention applies to any booster, such as the one of FIG. 2 for example, in which the valve 7 comprises a tubular shutter 70, a first end 71 of which is selectively applied against a first seat 72 in order selectively to prevent and to allow a flow of air to be set up between the second pressure source A and the second working chamber, the actuation of the valve 7 being controlled by the plunger 8 which makes it possible selectively to move the first end 71 of this tubular shutter 70 away from this first seat 72.

According to the invention (FIG. 3), the tubular shutter 70 has freedom of movement with respect to the plunger 8 in the first axial direction S and is urged elastically against the plunger 8 in a direction which is the opposite of the first axial direction S.

Moreover, the first end 71 of the shutter 70 is connected to a mass 15 capable of being set in motion by a movement of the plunger 8 in the first axial direction S in order to push the first end 71 of the tubular shutter 70 back away from the plunger 8 and thus increase the air flow between the second pressure source A and the second chamber 3b.

For example, the first end 71 of the shutter 70 may include a metallic insert 73 secured to a rod 16 fastened to the mass 15 and passing with sliding through an orifice 81 made in the plunger 8.

Under these conditions, the mass 15 may be set in motion in the direction S by a relief 82 provided on the plunger 8 and the tubular shutter 70 may be urged elastically against the plunger 8 by means of the spring 17 surrounding the rod 16 and tending to move the mass 15 away from the orifice 81.

We claim:

1. A pneumatic booster comprising: a rigid casing divided in leaktight fashion into at least first and second variable-volume working chambers, said first variable-volume working chamber being is connected to a first pressure source delivering a first pressure, and the second variable-volume working chamber being connected selectively, by means of a three-way valve, to said first pressure source or to a second pressure source delivering fluid at a pressure different from said first pressure, a moving partition separating the said first and second variable-volume working chamber inside the casing and capable of being urged by a pressure difference established selectively between said first and second variable-volume working chamber through the actuation of said three-way valve; a pneumatic piston which can move with said moving partition and which contains the three-way valve, said three-way valve comprising a tubular shutter having a first end which is selectively applied to a first seat in order selectively to prevent and to allow a flow between said second pressure source and the second chamber; an operating rod housed in said piston and moveable in a first axial direction to control the actuation of the three-way valve by means of a plunger capable of moving said first end of the tubular shutter away from said first seat; a push rod moveable in the first axial direction to receive and thereafter transmit an output force oriented in a first axial direction; and reaction means interposed between said operating rod and said push rod in order to apply to said operating rod a reaction which increases with the output force, characterized in that said shutter has a freedom of movement with respect to said plunger in said first axial direction and is urged elastically against said plunger in a second direction which is the opposite said first axial direction said first end of said shutter being connected to a mass which can be set in motion by a movement of said plunger in said first axial direction in order to push said first end of said tubular shutter back away from said plunger to increase the flow of air between said second pressure source and said second chamber.

* * * * *